July 15, 1958     C. L. COPELAND     2,843,276
SYSTEM FOR LOADING AND UNLOADING OF TRUCK-TRAILERS
AND RAILROAD CARS
Filed May 17, 1955     8 Sheets-Sheet 1
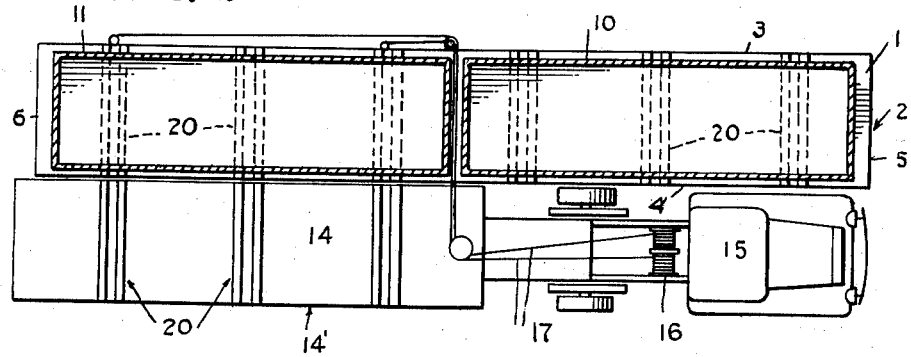
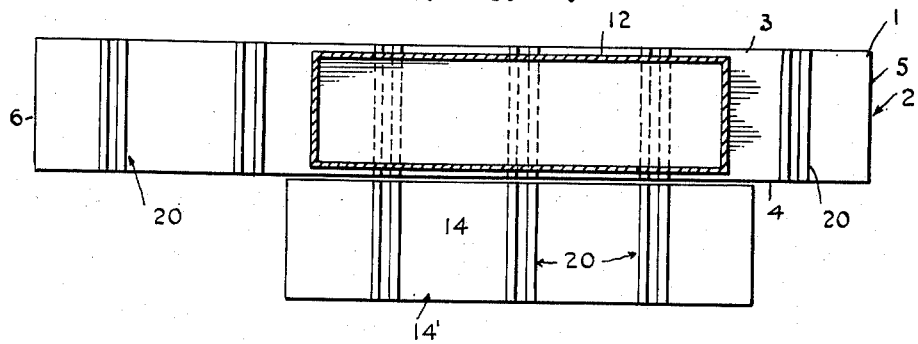
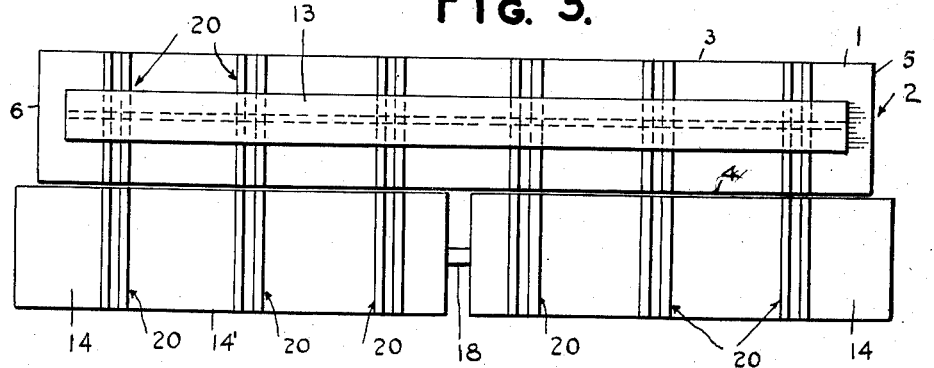
INVENTOR
CLAUDE L. COPELAND
BY *Gardner J. O'Boyle*
ATTORNEY

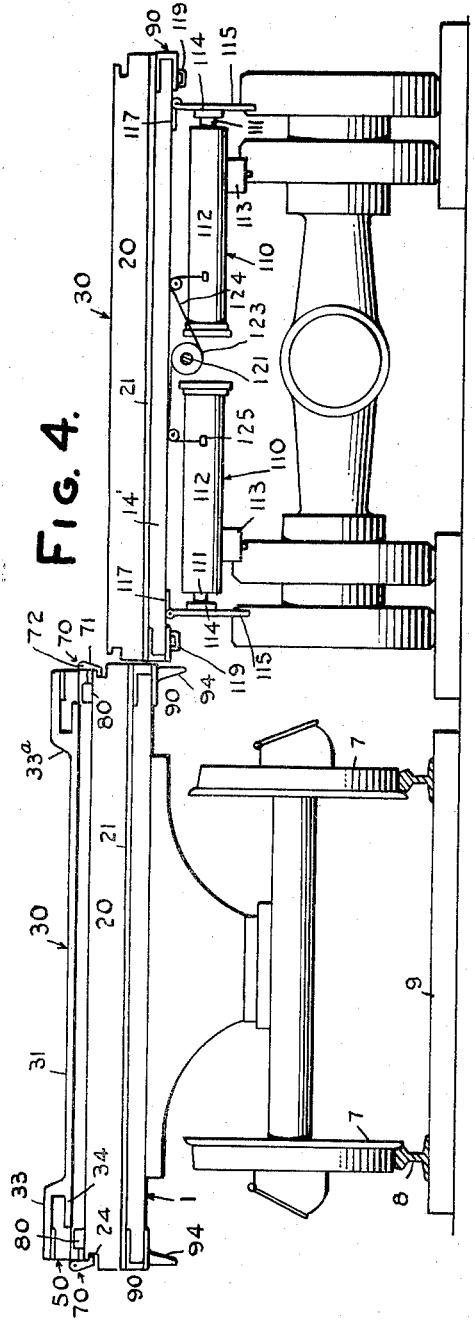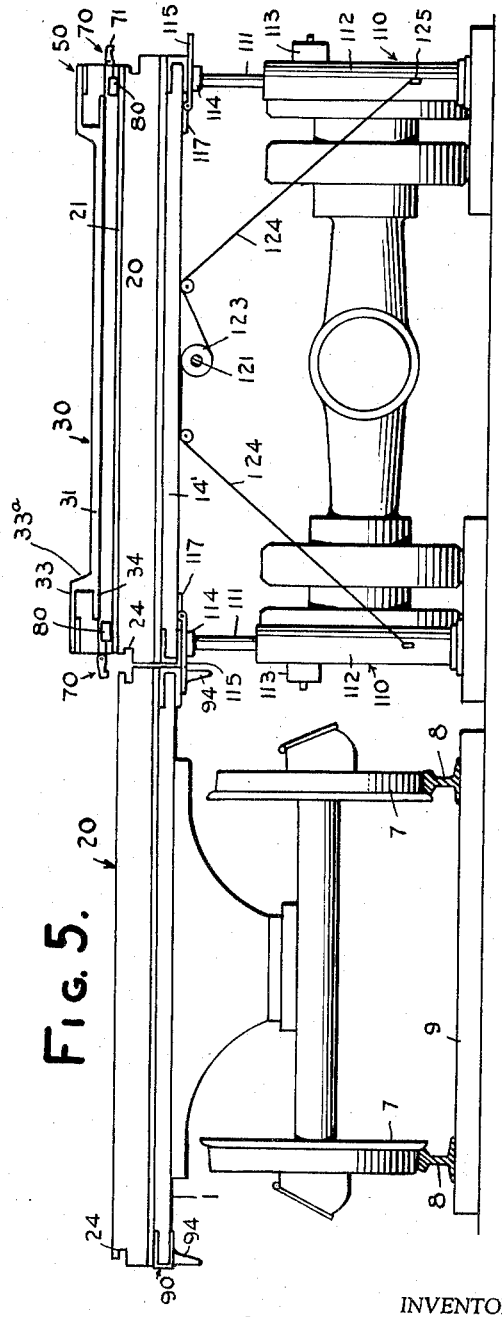

July 15, 1958  C. L. COPELAND  2,843,276
SYSTEM FOR LOADING AND UNLOADING OF TRUCK-TRAILERS
AND RAILROAD CARS
Filed May 17, 1955  8 Sheets-Sheet 3

INVENTOR
CLAUDE L. COPELAND
BY
ATTORNEY

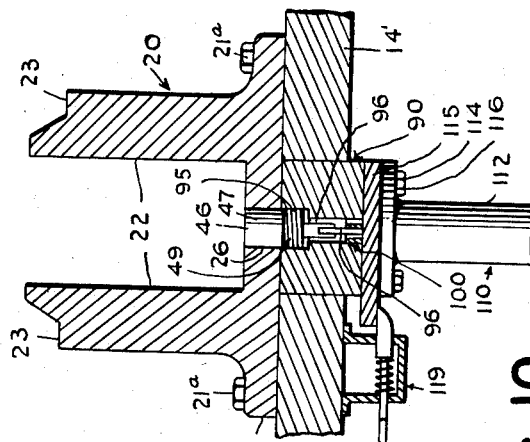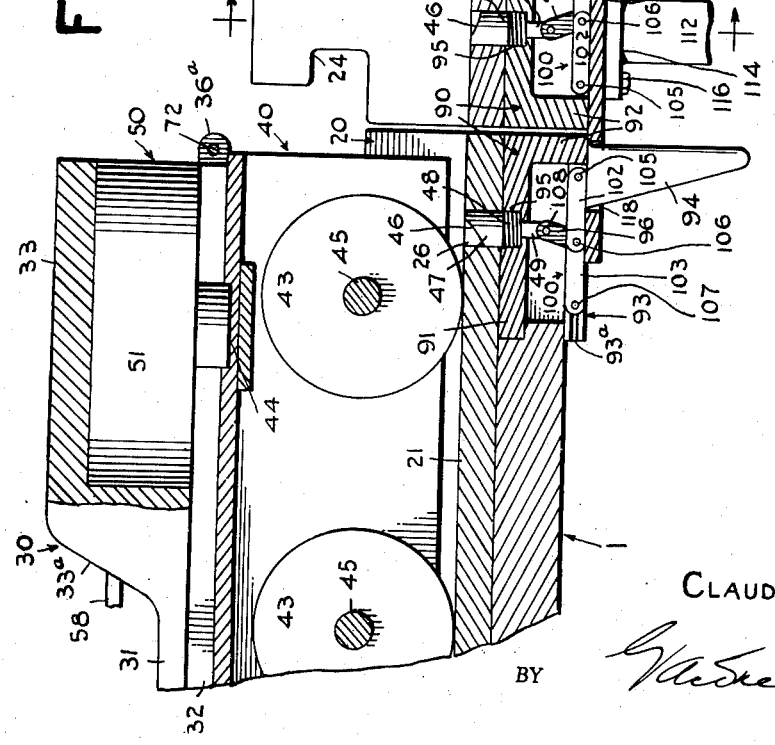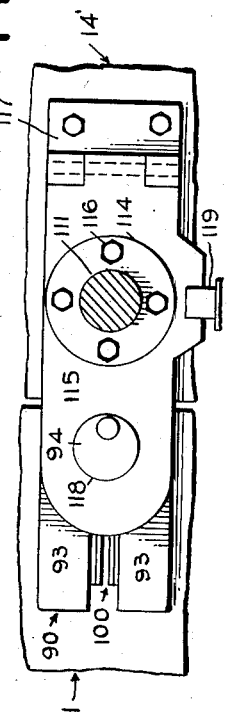

July 15, 1958 C. L. COPELAND 2,843,276
SYSTEM FOR LOADING AND UNLOADING OF TRUCK-TRAILERS
AND RAILROAD CARS
Filed May 17, 1955 8 Sheets-Sheet 5
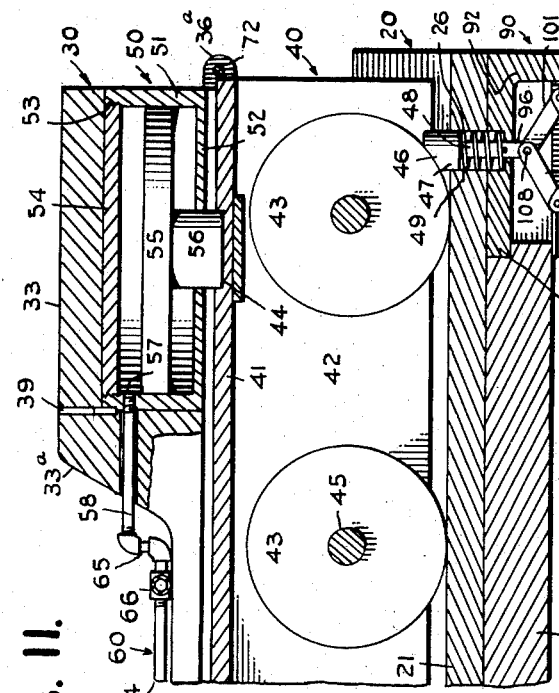
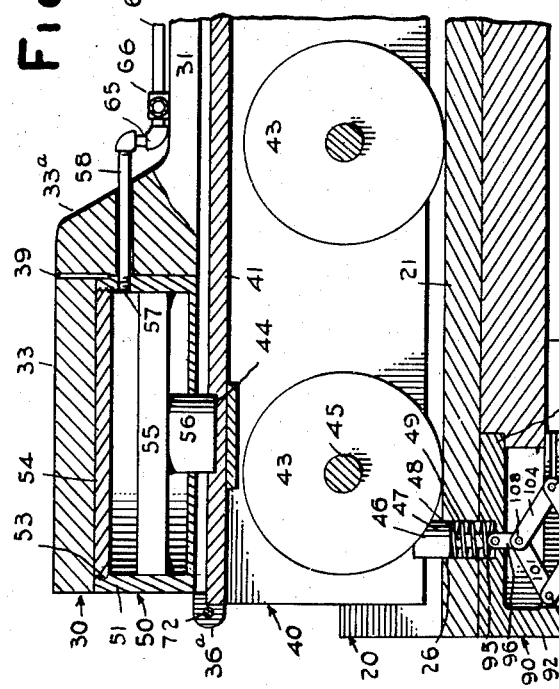
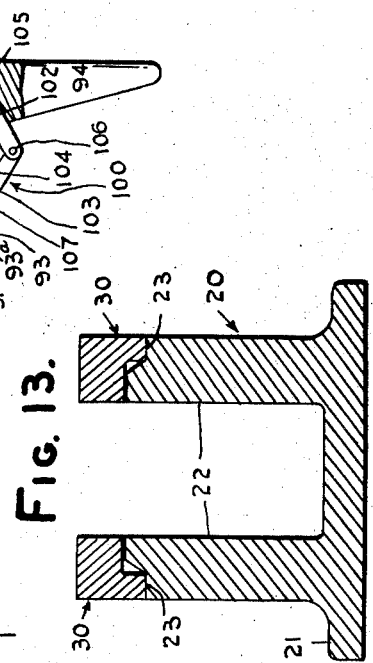
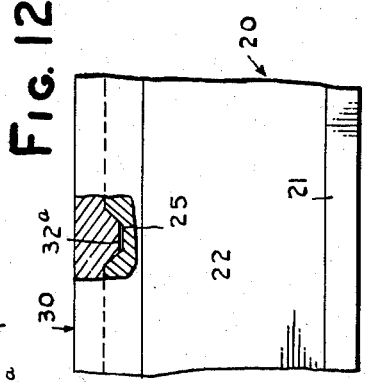
INVENTOR
CLAUDE L. COPELAND
BY
ATTORNEY July 15, 1958
C. L. COPELAND
2,843,276
SYSTEM FOR LOADING AND UNLOADING OF TRUCK-TRAILERS AND RAILROAD CARS
Filed May 17, 1955
8 Sheets-Sheet 6
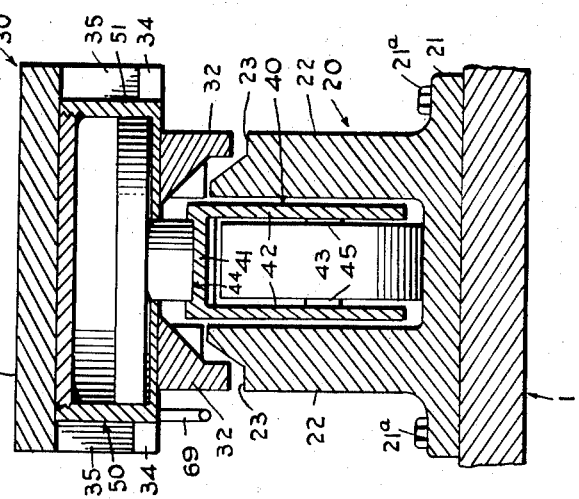
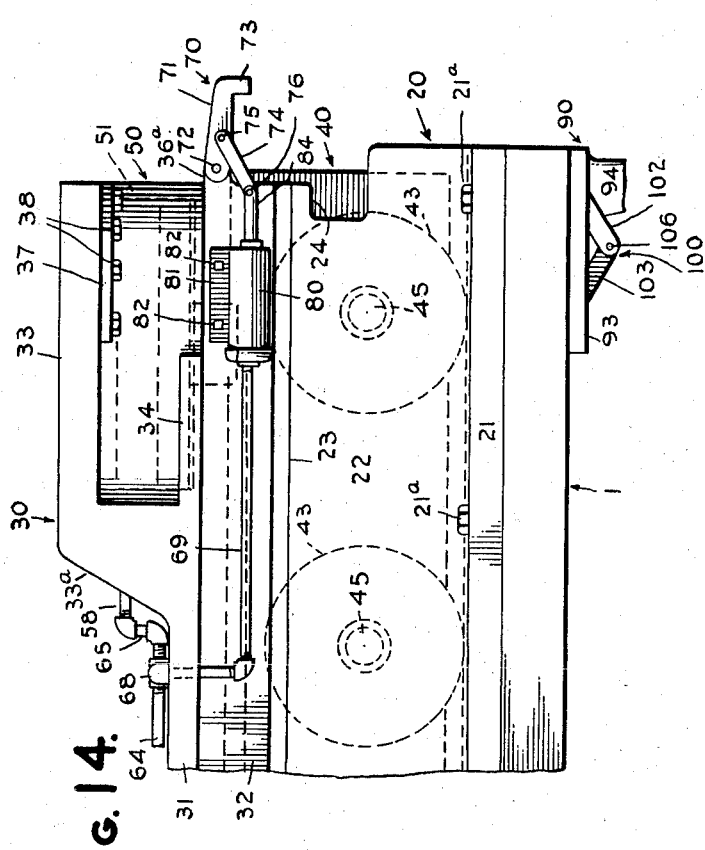
INVENTOR
CLAUDE L. COPELAND
BY
ATTORNEY July 15, 1958 C. L. COPELAND 2,843,276
SYSTEM FOR LOADING AND UNLOADING OF TRUCK-TRAILERS
AND RAILROAD CARS
Filed May 17, 1955 8 Sheets-Sheet 7
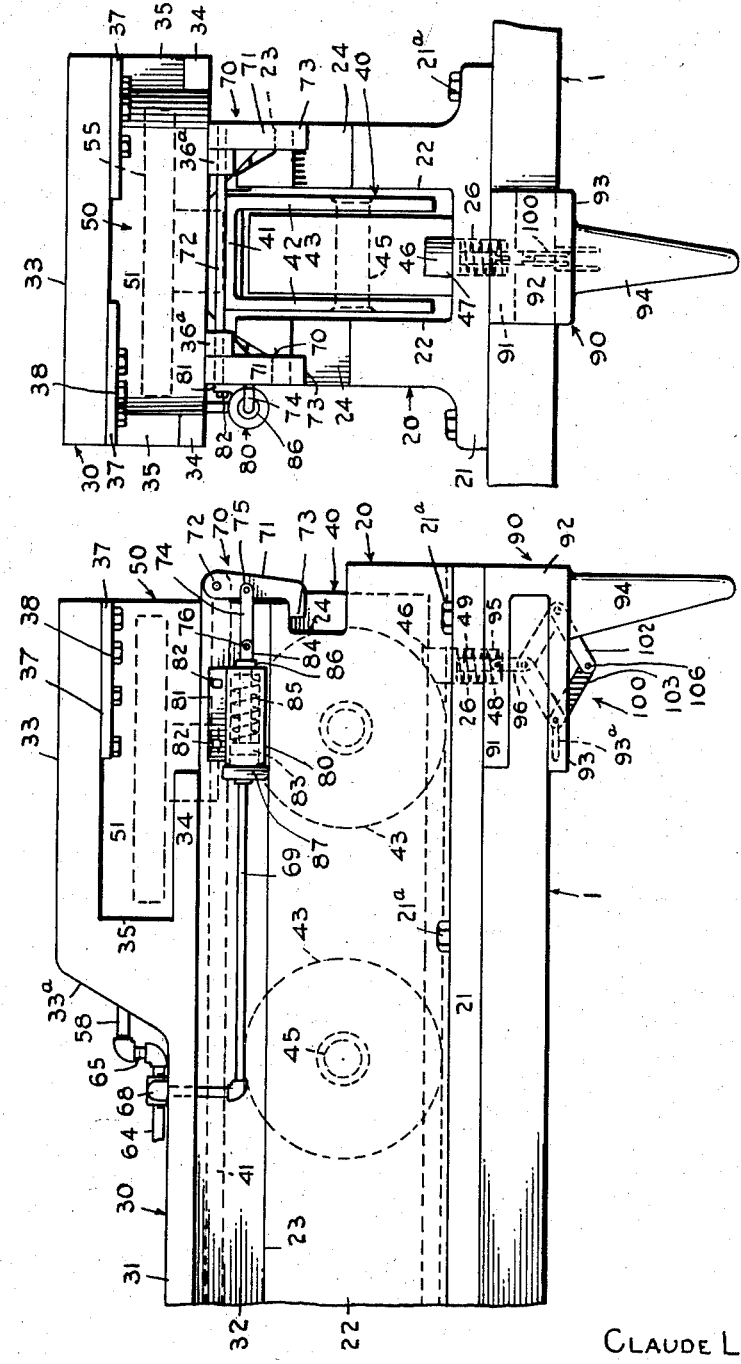
INVENTOR
CLAUDE L. COPELAND
BY
ATTORNEY July 15, 1958 C. L. COPELAND 2,843,276
SYSTEM FOR LOADING AND UNLOADING OF TRUCK-TRAILERS
AND RAILROAD CARS
Filed May 17, 1955 8 Sheets-Sheet 8
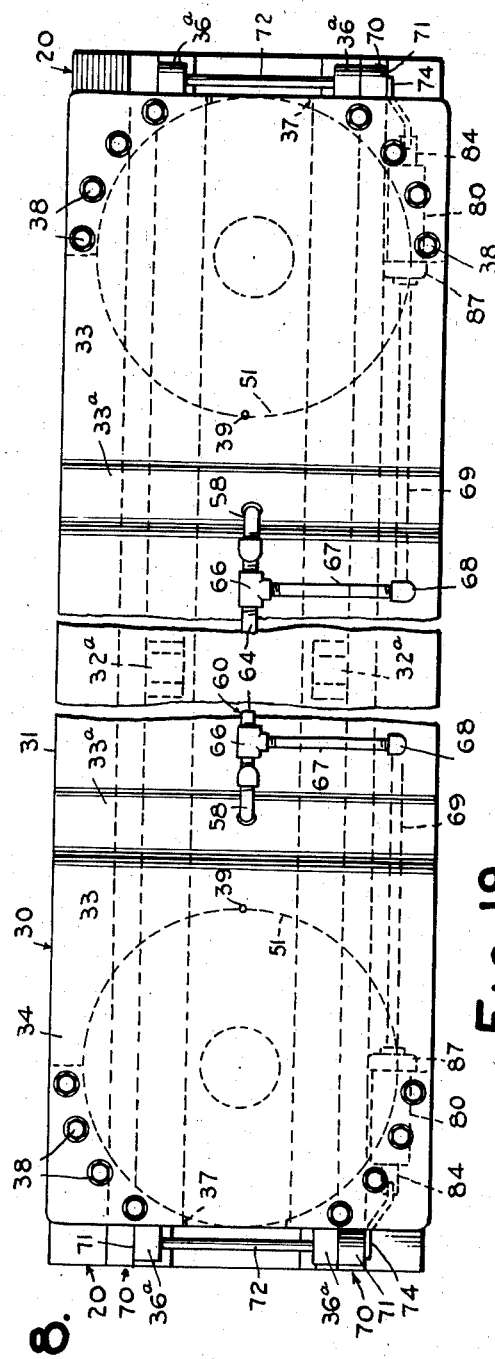
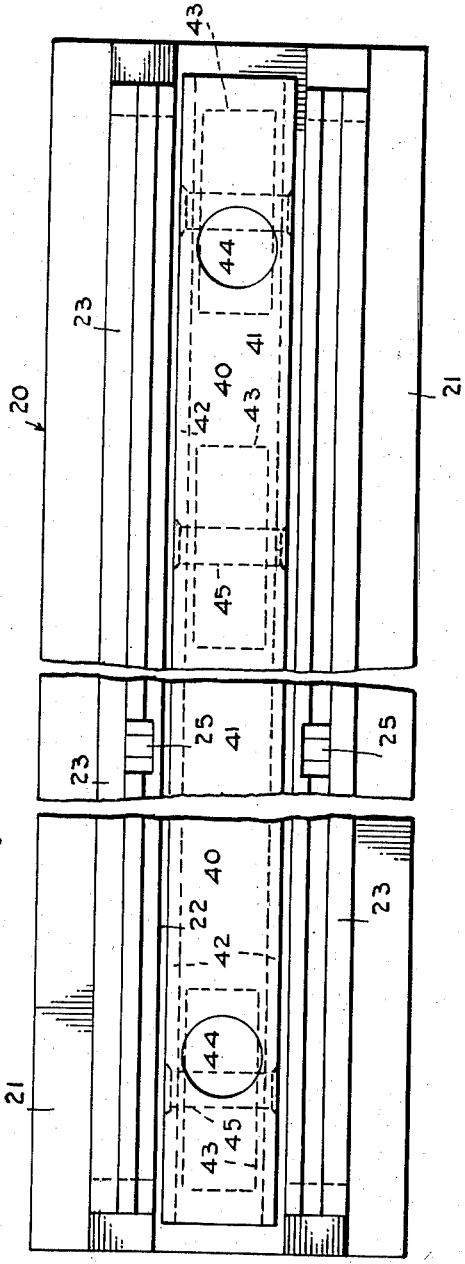
INVENTOR
CLAUDE L. COPELAND
ATTORNEY United States Patent Office 2,843,276
Patented July 15, 1958

2,843,276

SYSTEM FOR LOADING AND UNLOADING OF TRUCK-TRAILERS AND RAILROAD CARS

Claude L. Copeland, Pittsburgh, Pa.

Application May 17, 1955, Serial No. 508,844

18 Claims. (Cl. 214—38)

This invention relates to novel transportation systems for shipping containers, and more particularly, to a novel system for loading and unloading freight containers on and from freight cars, and transferring the same to and from trucks and trailers. Additionally, the invention is directed to special equipment features adapted for use with standard railroad cars and carriers such as trucks, trailers, and the like.

The development of LCL freight units (less-than-carload lots) has, up to date, been restricted to relatively small units, usually six to a flat car or gondola, and which are handled by small cranes permanently installed at railroad yards. Substantially no attempt has been made to improve the facilities for handling large size containers (3 to a flat car), extra long containers or loads, such as telephone poles and automobile carrier trailer loads, which are too long for half a car, and too short for a full car load. Also, extra long loads, such as bridge girders, cannot be conveniently handled by presently available equipment.

The above-recited disadvantages of the prior art are essentially overcome by the improvements of the present invention, which convert LCL containers of various sizes, loading bridles for girders, pipes, poles, etc., into mobile units adapted to be readily transferred from carrier vehicles to railroad cars, and vice versa. The novel improvements, as will appear more fully hereinafter, essentially comprise transversely dispoesd male rail members secured to the floors of railroad cars and carrier vehicles, and cooperating female supporting members secured to and supporting a superposed load or container. The male and female members are split to receive wheeled transfer carriages adapted to transfer a unit load from one vehicle to another. The transfer carriages are desirably included as a part of the equipment of the carrier vehicle. The carrier vehicles incorporate means for adjusting their floor levels to the levels of the railroad cars, and means are provided for interlocking engagement of the carrier vehicles with railroad cars to which they are apposed.

An object of this invention is to provide a novel transfer and transportation system for less-than-carload lot freight shipments.

Another object of this invention is to provide a system of the character described which is adapted for incorporation in standard railroad cars and carrier vehicles without requiring alteration of the basic structures thereof.

Still another object of this invention is to provide a transverse, interlocking rail system for use in the transfer of unit loads from a railroad car to a carrier vehicle, and vice versa.

Yet another object of this invention is to provide means for the mutual alignment and interlocking of a carrier vehicle with a railroad car to provide means for the mechanical transfer of a unit load from one to the other.

A further object of this invention is to provide load carrier and transfer means severally secured to a railroad car and a unit load, and optionally operable to fixedly support the load on the car or lift it to a transfer position, and to provide wheeled transfer elements operable to support the load when it is lifted to a transfer position.

With these and other objects in view, which may be incident to my improvements, the invention consists in the parts and combinations to be hereinafter set forth and claimed, with the understanding that the several necessary elements, comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings, like numerals refer to similar parts throughout the several views, of which Figure 1 is a top plan view of a railroad flat car loaded with two loads mounted on equally spaced load-supporting rails, a trailer chassis juxtaposed to one load, and a power unit with a winch coupled to the rear load;

Fig. 2 is a view similar to Fig. 1, showing one load of the type of which two loads are too long for a flat car;

Fig. 3 is a view similar to Fig. 2, showing a double trailer hitch, with an exceptionally long load (girder) transferred to a flat car;

Fig. 4 is an end elevation of a loaded flat car and an opposed truck, before the floor of the truck is horizontally aligned with the floor of the flat car;

Fig. 5 is a view similar to Fig. 4, showing the aligned floorings (decks) of the flat car and the truck, and the load and supports transferred to the truck;

Fig. 8 is a fragmentary vertical section through one end of juxtaposed assembled male and female rails, with carrier and automatic carrier stop;

Fig. 9 is a vertical cross-section through a male rail as taken on line 9—9 of Fig. 8;

Fig. 10 is a bottom plan view of the interlocking mechanism shown in Fig. 8;

Fig. 11 is a broken vertical section through a mated rail assembly showing the carrier locked in position;

Fig. 12 is a fragmentary detail of interlocking means for a mated rail assembly;

Fig. 13 is a transverse section through a mated rail assembly;

Figs. 14 and 15 are, respectively, a phantom side view and an end view of a disjointed rail assembly with the female member supported by the wheeled carrier in load-transferring position;

Figs. 16 and 17 are, respectively, views similar to Figs. 14 and 15, but showing the rail members in mated, load-carrying position and the wheeled carrier in non-load carrying, locked position;

Fig. 18 is a broken bottom plan view of rail assembly, showing the details of the securing of the reciprocating loadbearing pistons, and Fig. 19 is a top plan view of the structure of Fig. 18, showing the spring biased pistons and the subjacent wheeled carrier frames.

*General combination*

Figure 6:
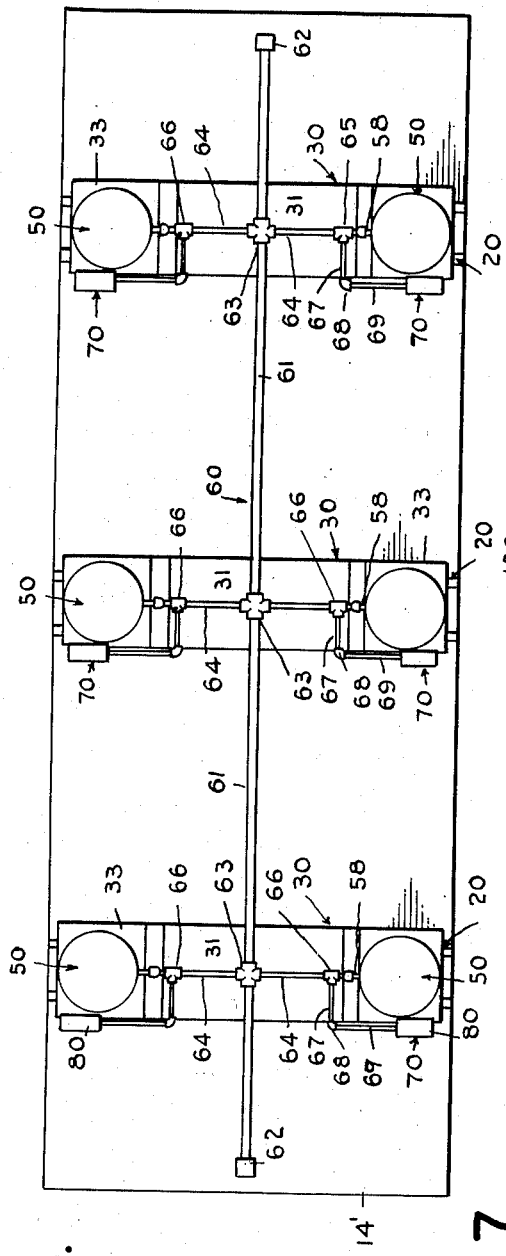
Figs. 6 and 7 are, respectively, top and bottom plan views of the flooring of the flat car and trailer, and showing the control elements for the transfer equipment.

Referring to the drawings, and more particularly, to Figs. 1–3, inclusive, there is indicated generally the floor or deck 1, of a flat car 2, having spaced sides 3, 4, and ends 5, 6. The car is provided with the usual wheels 7 (Fig. 4), mounted on axles and adapted for rolling engagement with rails 8, secured on cross-ties 9.

In the loading arrangement illustrated in Fig. 1, a pair of uniformly sized containers 10, 11, are mounted on the deck 1, of a flat car, and substantially cover the entire surface thereof. In the arrangement illustrated in Fig. 2, a container 12 is shown disposed somewhat centrally of the floor space of the car. It is to be noted that container 12 is appreciably longer than the half-length of the car, so that only one such container can be loaded on the car. In the arrangement illustrated in Fig. 3, a steel girder 13 is cradled or otherwise suitably mounted along the central longitudinal axis of the flat car 2.

For the transport of the container units illustrated in Figs. 1 and 2, single trailer hitches 14 may be used with a single power car 15 equipped with a winch 16 and cables 17 to transfer the container from the trailer to the flat car, or vice versa, in the usual manner. In Fig. 3, a pair of tandem trailer hitches 14 are intercoupled by a coupling 18.

The rolling transfer of containers from one transport unit to another is made possible by the use of dollies in association with separable, mating rail elements, mounted in spaced relation on both the railroad cars and the trailer hitches, as will be described more in detail hereinafter.

The invention herein is predicated upon the desirability of the direct transfer of LCL containers, of the character described, from one type of transportation unit to another, without requiring loading docks and the incident multiple handling of the containers. As previously noted, the improvements of the present invention are essentially concerned with transfer elements comprising compound rail members which will now be described.

The novel load-transfer mechanism herein comprises a plurality of transversely disposed, uniformly spaced, parallel devices, each of which consists of a fixed base member 20, a superjacent reciprocable load-supporting beam member 30, apposable to member 20, a wheeled load-supporting and carrying member or dolly 40, nested in and between members 20 and 30, and top rail jack or lifting mechanisms 50 incorporated in member 30, selectively operable to seat and unseat member 30 with respect to subjacent base rail member 20, the jacks being normally interlocked with dollies 40, whereby the latter are made integral rolling supports for superposed loads secured on upper rails 30.

To facilitate an understanding of the mutual cooperation of the several elements of the invention, the elements and cooperating fitments will be severally described before proceeding with the consideration of their assembly and function.

The base member 20 is channel shaped, with a bilaterally flanged bottom 21 and relatively deep, spaced sides 22, having chamfered top edges routed to form bearing shoulders 23 therealong. The ends of sides 22 are recessed to form locking notches 24. Locating sockets 25 are formed in the chamfered edges at about the transverse center of member 20, and are adapted to receive locating pins 32a of superposed upper rail members 30 (Fig. 12). In the form shown, the bases 20 are fixedly secured to a supporting flooring or deck by machine screws, or equivalent fastening means, designated generally by the numeral 21a. Members 20 form restraining, open-ended housings for the elongated dollies or wheeled load-carrying members 40, whose wheels or casters 43 are adapted for smooth rolling bearing engagement on the inside surfaces of bottoms 21, the inverted channel frames of the dollies 40 having close clearance with the sides 22 of bases 20, whereby side sway of the dollies 40 is prevented. Axial apertures 26, formed in and adjacent the ends of bottoms 21, serve to journal reciprocable locking pins 46, engageable with the end wheels of each dolly 40, as will be described more in detail hereinafter.

The upper, load-supporting members 30 are adapted for mating fit engagement on and with base members 20, and are vertically reciprocable into and out of such engagement. These members are substantially coextensive with the flanged bottoms 21 of bases 20, and are severally comprised of a central, inverted channel shaped body section 31, overhanging internally, chamfered, short sides 32, and integral, raised, load-supporting platform sections 33 at the ends thereof, joined thereto by slope sections 33a. The platforms 33 incorporate forked extensions 34, subjoined to and spaced therefrom to form transverse slots 35 inboard of the platforms, the outboard surfaces of slope sections 33a, subjacent the platforms 33, being desirably curviform to provide a conformed bearing surface for piston casing 51 of the lifting or jack mechanism 50. The outer ends of sides 32 are severally provided with aligned hinge elements 36a, the space between the hinge elements serving as a slot for the reception of the piston rod 56 of lifting jack 50. The piston casing 51 of jack 50 is adapted for sliding, conformed fit engagement in the holding device formed by and between the platform 33, slope section 33a, outboard extensions 34, and terminal ends 36 of sides 32, and is adapted to be detachably secured in place by conformed outboard clamping member 37 subjoined to platform 33 by machine screws 38, or equivalent securing members. The chamfered sides 32 incorporate locating pins 32a adapted for seating engagement in locating sockets 25 of bottom rails 20. Keys 39 fitted in platforms 33 engage peripheral grooves in jack casings 51, and prevent the latter from rotating.

As will appear more fully hereinafter, the platforms 33 provide broad supporting surfaces of ample area, and the members 30 may serve as permanent base members for superposed load containers, being transferred therewith from one vehicle to another. Where girders, poles, and other oversize items are transported, they may be fixedly attached to the requisite number of supporting members, and the assembly handled as a unit.

An important element of the load-transferring mechanism of this invention is the elongated dolly 40, one of which serves as a wheeled load-supporting and carrying member for each supporting girder 30, and its superjacent load or load container. Each dolly 40 is comprised of an elongated, inverted channel member having a flat top 41, depending sides 42, and spaced wheels 43, mounted for rotation on axles 45 severally journaled in sides 42. Each dolly is adapted to be received in and housed by a base member 20, with a slight side clearance, the sides of the dolly being atrip of the floor of the housing and extending the full depth and length thereof. The top of the dolly is provided, adjacent its ends, with sockets 44, adapted to register with and permanently seat the pistons 55 of jack mechanisms 50, whereby each dolly is made a functional rolling base for the load-carrying superjacent top rails 30, and remains interlocked therewith when the transverse supports or top rail members 30 are directly carried by the bottom rail members 20. Axial movement of each dolly is further prevented, under these same conditions, by the engagement of conformed bearing surfaces 46 of locking pins 47 journaled in openings 26 in base 20. The interlocking of the pins 47 with the clamping of rail members 30 and the actuation of jacks 50 will be considered more in detail hereinafter when discussing the mode of operation of the assembly.

The top rail jack mechanisms, designated generally by the numeral 50, are shown in Figs. 6, 11, and 14–18. As shown in detail in Fig. 11, these devices severally comprise a flat, pill-box type cylindrical piston casing 51 having a centrally apertured bottom 52, and a threaded open top 53 receiving a mating threaded top or closure 54. The piston casing 51 reciprocably mounts a heavy piston 55 with its subjoined piston rod 56 journaled in apertured bottom 52. The piston rods 56 are of appreciable size, and, as noted above, are adapted to register with and be permanently seated in sockets 44 on the top of dollies 40. A fluid entrant 57 is formed in the wall of casing 51, above the top of the piston 55, and a threaded stub pipe 58 is tapped into the entrant, and passes through a suitable aperture in slope section 33a of upper rail member 30. The pipe 58 is coupled to a fluid-actuated control system 60 to be described more in detail hereinafter.

Because of the construction of the jacks 50 herein, the weight of each piston causes it to fall to the bottom of its casing, or as near thereto as the bearing of its subjoined piston rod will permit, and the piston serves as a fixed piston. In this position, the upper rail member and the dolly are interlocked at all times. When the upper rail members are seated on the bottom rails, the weight of the upper rail members, together with superposed loads, is directly and wholly borne on and by the bottom or male rail members. When a pressurized actuating fluid is introduced into piston cylinders 51 through pipes 58, the pistons 55 being immovable, the piston cylinders or casings are unseated and are lifted vertically, carrying upper rail members 30 and their superposed loads therewith. Simultaneously, the depending sides of the upper rail members are unseated from their keyed bearing engagement on and with the sides of the bottom rail members, and the weight of the upper rails and superposed loads is automatically transferred to and borne by the dollies 40, as shown in detail in Fig. 15.

The rail jack control system 60 is adapted to supply pressure air simultaneously to the jacks associated with the load-carrying upper rail members secured to any container. As shown in Fig. 6, the system comprises a main control air pipe 61, having universal air hose connections at each end, which connections should extend past the end of any superposed container. The pipes 61 extend across the central sections 31 of the upper rail members, the latter being of essentially sway-back construction with the load-supporting platforms 33, each end being elevated a sufficient distance above the top surface of sections 31 to permit the fitting of the piping 60 without any load imposed thereon. Each air lift cylinder or jack 50 is connected to the main air supply 61 through line 64, fitted in couplings 63. The transverse or side arms 64 have double angled connections 65 connecting with the entrant pipes 58 of the jacks. Each line 64 is provided with a T-connection 66, off-take pipe 67, elbow 68, and line 69 coupled to spring-loaded cylinder 80, which is adapted to actuate the hinge hook locking members 70 for engagement in and with the slots 35.

A special feature of this invention is the automatic interlocking of the load-bearing upper rail member 30 with fixed base rail members 20, when members 30 are apposed thereto in interfitted mating seating engagement. The hinge hooks at the ends of each female rail are operatively interlocked with the rail jacks, as shown in Figs. 6, and 14–18.

The hinge hooks and actuating system therefor are designated generally by the numeral 70 and are comprised of spaced hook members 71 fixedly mounted on axis 72 which is journaled in spaced lugs 36a at the ends of members 30. The hooks have terminal hook sections 73, at right angles to the body portions, which are adapted for interlocking engagement with notches 24 in the ends of the sides 22 of bottom rail members 20. One end of a link arm 74 is pivotally connected at 75 to one of a pair of hook members 71, as indicated, in Figs. 14 and 16, and the other end is pivoted at 76 to the outer end of piston rod 84 of spring-loaded air cylinder 80. Air cylinder 80 incorporates a unitary flange 81, which is secured by machine screws 82, or equivalent securing means to the outside of a side wall 32 of the upper rail, the cylinder being shielded from above by the overhang of platform 33. The cylinder 80 mounts a piston 83 on piston rod 84, the piston being spring-loaded by compression spring 85 fitted over the piston rod and having bearing engagement against the piston and the closed end 86 of the cylinder. A cap member 87 is threadedly secured on the open end of the cylinder and is tapped to receive air pipe 69 of the air piping system 60.

The use of a common air piping system for the actuation of the lifting cylinders or female rail jacks and the hinge operating cylinders insures a positive interlock of the rail members 20 and 30 in their mated, load-bearing position, as illustrated in Figs. 16 and 17, and the unlatching of the hinge hooks 71 when the upper rail 30 is unseated and the load thereby transferred to dolly 40, as illustrated in Figs. 14 and 15.

In the operation of the system, where a dolly-supported load is to be transferred from a railroad car to a motor vehicle, or vice versa, a pressure air supply is coupled to the piping system 60 through a flexible air hose, or the like. When air is supplied to this system, as shown in Figs. 14 and 15, the lift jacks 50 are actuated, and the hinge hooks unlatched, whereby the upper rails and their load are supported on dollies 40. The pressure air introduced into cylinder 80 forces piston 83 out, against the bias of loading-spring 85, and piston rod 84 actuates link arm 74 to move hooks 71 and unlatch them from engagement with locking notches 24 in the base member. In this condition, the load can be transferred, on its supporting dollies, onto another vehicle having identical sets of aligned base members 20 in register with those of the first vehicle.

When the dollies and their supported load have been rolled into position on the new vehicle, the pressure air is released, and the lift jacks collapse, lowering the upper rail members into locked seated bearing engagement with the supporting fixed rail members 20. Simultaneously, the spring-loaded pistons of the hinge hooks actuating system are reseated, and the hooks are thereby engaged in latching position with the base members.

The system herein is especially adapted for the direct rolling transfer of containers and oversize loads from a trailer truck, or the like, to a railroad car, a necessary condition of such type of transfer, as herein contemplated, being the alignment, at a common level, of the fixed base supporting members. A second condition is that the car and truck shall be abutted and interlocked during such transfer. The alignment, at a common level, is preferably attained by providing the road vehicle, trailer truck, or the like, with hinged jacks operable to raise the level of the floor of a vehicle up to that of a railroad car, since railroad cars usually ride higher than road vehicles. The interlocking is accomplished by providing fitments on the railroad cars adapted to be engaged and interlocked by and with the cap plates of the hinged jacks of the road vehicles. The locking elements for the dolly wheels are identical for both railroad cars and vehicles, but the carrier members or lugs in which they are embodied are different and will be separately considered.

The rail car and the vehicle are provided with locking lugs 90, corresponding in number to the ends of base members 20, and interlocked therewith. The members 90 comprise a generally U-shaped clamp member adapted to be fitted over the sides of car floors 1, and truck floors 14', and are secured thereto in any suitable manner. These members have a flat top 91, closed outer end 92, and centrally slotted bottom 93. The rail car lugs also incorporate integral, rearwardly tapered locking pin 94, subjoined to and integral with the outer end of bottom 93. The top 91 is socketed at 95, to receive detent 47 and biasing spring 48, and the socket is tapped to reciprocably receive depending spindle 49, coupled through a link arm 96 to a locking linkage 100, to be described more in detail hereinafter. Each detent 47 is provided with a curviform bearing surface 46, adapted to be biased against the rim of an end wheel 43 of a dolly 40, as shown in Figs. 11, 16 and 17.

The link arm control 100 of spring loaded detents 47 is comprised of link arms 101, 102, 103, 104, pivotally joined by pivot pins 105, 106, 107, 108, as shown. Pin 105 is fixed in the outer end of slotted bottom 93 of member 90, while pin 107 is reciprocable in spaced slots 93a thereof. Pin 108 serves to couple link members 96, 101, and 104 together, and acts as the driving or tension member of the linkage. Thus, when the biasing spring 48, seated in socket 95, urges detent 47 into locking, bearing engagement with an end wheel of the dolly or wheeled carriage 40 (Fig. 8), the linkage 100 is moved to the open position shown in Figs. 11, and 14–17. When a counter-biasing force (Figs. 8–10) is applied to the joint coupling links 102 and 103, the linkage 100 is closed, the detent 47 is retracted against the bias of spring 48, and the dolly 40, together with the superposed female rail member 30, and supported load, can be rolled away.

Figure 7:
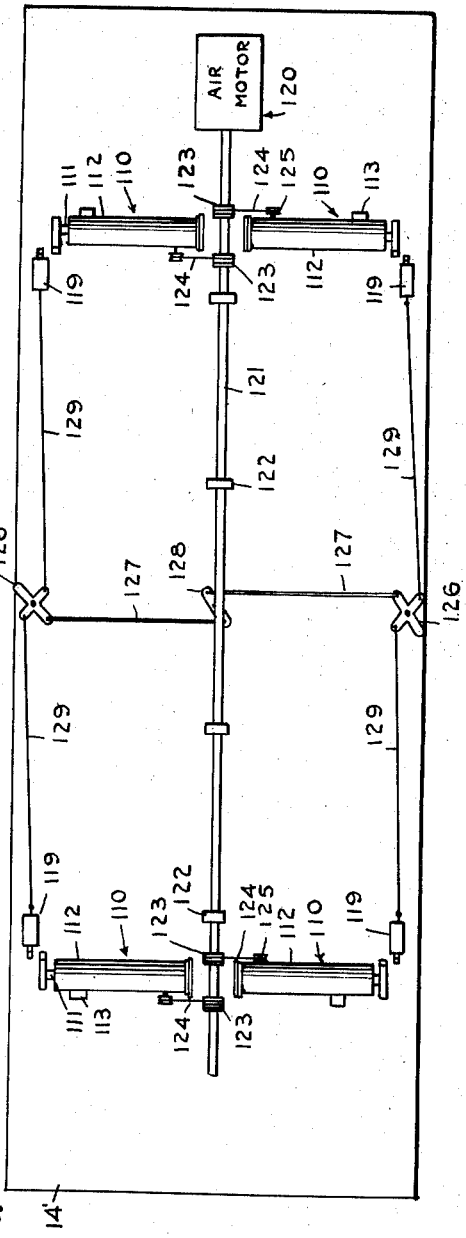

Turning now to Figs. 4, 5 and 7, the layout of the truck lifting jacks and their operation will be considered. The jacks, designated generally by the numeral 110, are of the screw spindle type having screw spindles 111, fitted in housings 112, and driven by air motors 113, integral with the casings 112. Each spindle has a flat top bearing surface 114, on which a hinged bearing plate 115, is fixedly secured by machine screws 116, or the like. The plate 115 is hinged at one end to a supporting plate 117 fixedly mounted on the under surface of truck flooring 14'. The hinged bearing plates are adapted to overlie the locking lugs 90 of the trucks and the major portion of the under surfaces of similar lugs on a railroad car, when apposed to a truck. The outer ends of the plates 115 are apertured, as shown at 118, to progressively engage the tapered rear surfaces of locking pins 94 of lugs 90 of rail cars. It will be appreciated that the pins 94 may be formed integral with lugs 90, or they may comprise detachable inserts secured therein and thereto in any suitable manner. When the jacks have bearing engagement with the ground the apertures 118 of hinged bearing plates 115 are fitted over cooperating pins 94, and as the bearing plate is raised by the elevation of the screw spindle, the plate rotates about its hinge and the aperture is progressively engaged with the flaring taper of the pins, pulling the plates and the truck to which they are attached into abutting relation with and against the side of the rail car. When the bearing plates 115 are fully engaged with apposed lugs 90 of juxtaposed vehicles, they are locked in place by latch members 119 secured to flooring 14', immediately adjacent each said bearing plate.

The jacks 110 are jointly operated in the following manner: An air motor 120 is secured on the truck and drives an axially disposed shaft 121, secured to the floor by hangers 122, or the like. A plurality of sheaves 123, or reel members, are secured on the shaft, one being provided for each jack. Cables 124 are wound on the sheaves and are fixedly connected to lugs or pins 125 located on the jack housings 112, near the bottom thereof. By this arrangement, the jacks can drop, of their own weight, about the hinges 117 and the bearing plates 115 will be latched by members 119, after the spindles have been raised by the air motors 113. The motors 113 are coupled to a suitable air supply through flexible couplings. When the jacks are to be retracted, the latches 119 are withdrawn from their locking engagement with hinged bearing plates 115, the air motors 113 are reversed, seating the spindles in their housings and pulling the latter up on the spindles, and air motor 120 is actuated to drive shaft 121. The cables 124 are thereby wound up on sheaves 123, and the jacks are retracted up under the floor of the truck. To facilitate the unlatching of members 119, operating handles 126 may be disposed on opposite sides of the truck and interconnected through link arms 127 and pivoted link arm 128, the individual latches being directly connected to the operating handles on their side by cables or link arms 129.

It will be appreciated that, in accordance with the novel system of the present invention for loading and unloading freight containers, loads of various types may be readily transferred from carrier vehicles to railroad cars, and vice versa. The transfer carriages or dollies are readily available at all times, since it is contemplated that after the load has been moved from the carrier vehicle to the railroad car, or from the railroad car to the carrier vehicle, and the load is supported on and by the lower rails, the dollies remain within the opening formed between the sides of the lower rails. Accordingly, when it is desired to transfer the load, it is only necessary to actuate the load jack to bring the load in bearing engagement with the dollies.

Additionally, by reason of the novel aligning arrangement of the present invention, the car and carrier floors or platforms are quickly and easily brought into the same, or substantially the same, plane, with the bottom rails in register, whereby the sides of the rails form a clear, uninterrupted passage for the transfer carriages or dollies.

In connection with the power means for moving loads to or from the car or carrier vehicle, it will be appreciated that in lieu of a winch, cables, and block and tackle, as shown, that means may be provided for direct drive of the dollies, for example, screw means or other positive drive device.

To recapitulate the patentably novel features of the present invention, it will be noted that truck trailer bodies are adapted for "piggy-back" transportation on flat cars, thereby eliminating the dead weight, non-pay load chassis structures of the usual truck trailers. The elimination of the chassis structures from the flat car loads, lowers the center of gravity of such loads and makes for smoother riding by reason of the reduction or elimination of lateral and frontal load play which is characteristic of top-heavy load structures even including standard freight cars. Additionally, by forming each truck trailer body as a demountable unit with multiple, transverse subjoined channeled, supporting beams, the necessity for special transverse support members for truck trailer chassis and flat cars is eliminated. Each truck trailer chassis and flat car fixedly mounts cooperating transverse channeled supporting rails adapted for interfitting, cooperative engagement with superposed truck trailer bodies, and the latter are provided with multiple spring-loaded hinge-hooks adapted for automatic engagement with the said supporting rails, whereby the truck bodies are self-secured on trailers or flat cars, and without requiring extraneous tiedowns, such as chains, lashing, cleats, or any other securing means whatever.

The improvements of the present invention not only comprehend the use of demountable truck trailer bodies on truck trailer and flat cars and in automatic, self-locking relation thereon and therewith, but also, and importantly, a novel method and means of self-contained transfer of trailer bodies from trucks to flat cars, and vice-versa. The transfer means includes elongated dollies subjacent and coupled to each trailer body channeled supporting beam, and serving to carry a trailer body from one transportation unit to another, the dollies rolling in the aligned supporting channels of juxtaposed trailers and flat cars. To activate the dollies to active trailer body-transfer condition, the subjacent supporting beams are provided with air-lift jacks having depending, fixed piston rods seated in and on the dollies, the jacks, when lifted, raising the beams up out of normal, interlocked seating engagement with the fixed supporting channels of the truck trailer, or flat car, as the case may be, and transferring the beam-supported load (trailer body) onto the subjoined dollies. To insure positive alignment between cooperating fixed channels of juxtaposed railway cars and truck trailers, the latter are provided with lift jacks having heads mounted on hinged bearing plates having apertured extensions adapted to underlie and lockingly engage locating and locking pins mounted on the flat cars.

The hinged jacks are normally retracted up under the truck trailers. The interlocking of the hinged bearing plates also serve to actuate lazy tong retracting mechanisms coupled to spring-loaded detents, normally in locking, bearing engagement with the end rollers of the dollies, when the latter are housed in the fixed channeled supporting beams of flat cars and/or trailer bodies.

In lieu of providing railway cars having floors, the flooring may be eliminated, and the bottom rails of the container transfer arrangement of the present invention attached directly to the side and/or under framing of the cars. In other words, the railway car would then be in the nature of a two-part car, that is, an under frame part with spaced rails, and a removable container part.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims.

What is claimed:

1. In a transportation system of the character described, a truck trailer body adapted for interlocking engagement with and selective transfer to and from a truck trailer to a railway flat car, and vice versa, comprising, in combination, a truck trailer body fixedly mounting a plurality of parallel, spaced, subjoined transverse supporting members severally embodying integral depending flanges defining channel sections therebetween, said channel sections severally incorporating hold-downs at both ends thereof, said hold-downs comprising spring-biased hinge-hooks, and means for simultaneously releasing said hooks, the hold-downs being engageable with fixed members on a subjacent transportation unit.

2. An improved railway car for truck trailer body transportation, comprising a standard flat car transversely and spacedly mounting six fixed, parallel channel supports having upstanding shouldered sides with locking notches at the ends thereof, and severally provided with central locating sockets; the sides and bottom of each support forming dolly-receiving housings; spring-loaded detent means journalled in each end of the bottom of each channel; detent-retracting means at each end of said channels and severally comprised of U-shaped clamp members fixedly secured on and over the edges of the car in register with each end of the channels, and a lazy tongs linkage coupled to each detent, said linkage operable to retract the detents when apposed by hinged bearing plates of leveling jack heads of a truck trailer chassis interlocked with the rail car in trailer body transfer position.

3. Improved railway car according to claim 2, characterized by the fact that each U-clamp embodies an integral, depending locating pin at the front thereof, each said pin being rearwardly tapered to be received in and serve as a guide for an interfitted, apertured hinged bearing plate of a leveling jack head of an apposed truck trailer.

4. An improved railway car according to claim 3, characterized by the fact that the car mounts at least one demountable body of a truck trailer, said truck body secured to subjoined transverse supports in register with and supported by car-mounted supports, each said truck body support incorporating lift means and coacting spring-loaded hook latching means severally in locking engagement with the car-mounted supports, whereby the truck body is secured on and to the rail car as an integral element thereof; and roll-away truck body transfer means comprising elongated dollies housed in the car-mounted supports and locked therein by spring-loaded detents; said lift means keyed in and on the dollies and operable to unseat the truck body supports from the cooperating car-mounted supports and unlatch the hook latching means, whereby the truck body is solely supported on the dollies, through the lift means, and the truck body can be rolled off the rail car when the spring-loaded detents are deactivated.

5. An improved rail car according to claim 4, characterized by the fact that two demountable truck trailer bodies are mounted on the car.

6. An improved truck trailer comprising a wheeled chassis and a demountable body detachably secured on the chassis, said body having a plurality of integral, transversely disposed, bottom supports severally incorporating lift means and coacting spring-loaded hook latching means; a plurality of transverse supports affixed on the chassis and normally adapted to register with and support the first-named supports; roll-away means for the body comprising an elongated dolly subjacent each said first-named body supports and engaged by the lift means, each dolly fitted in a cooperating bottom support and normally locked therein by spring-loaded detent means; and said spring-loaded hook latching means normally interlocked with the bottom supports, the lift means being deactivated, whereby the truck body forms a functional unit with its subjoined chassis.

7. An improved truck trailer according to claim 6, characterized by the fact that actuation of the lift means unseats the body supports from the chassis-mounted supports and simultaneously transfers the load of the body supports onto the subjacent dollies while retracting and unlatching the spring-loaded hook-latching means, whereby on retraction of the dolly detents, the trailer body can be rolled off the truck chassis on and with the said dollies.

8. An improved truck trailer according to claim 7, characterized by the fact that lift jacks are hingedly mounted beneath the chassis on bearing plates secured to the lift jack heads, and each spring-loaded dolly detent is linked to a subjoined lazy tongs link mechanism and retractible thereby when each said mechanism is apposed by a hinged bearing plate as its attached lifting jack is swung into operative truck supporting position.

9. A truck trailer of the character described including, in combination, a wheeled trailer chassis and a roll-away body detachably mounted thereon, the chassis fixedly mounting a plurality of channel supports, and the body fixedly secured on a like number of subjoined supports severally incorporating inverted channel sections adapted to register and interlock with the chassis-mounted channel supports and form tunnel sections therewith; air-lift jacks incorporated in the ends of each body support, said jacks embodying fixed pistons with integral depending piston rods, and reciprocable piston cylinders locked in the supports; a common air supply for the jacks of each body coupled to the body supports; spring-loaded latching means attached to each jack and embodying air cylinder means coupled to the common air supply, the latching means having normal, spring-loaded, locking engagement with the chassis-mounted channel supports when the body is supported thereon and interlocked therewith; roll-away transfer means for the body comprising elongated dollies normally housed in the tunnel sections, each said dolly having an inverted channel frame and a plurality of rollers journaled in the channel sides, and sockets at the ends of the top of the frame, the sockets registering with and receiving piston rods of the air jacks, whereby the truck body is interlocked with the subjacent dollies, and the dollies serve to support the body when the air jacks are activated, lifting the body and its supports, and unlatching the body from the chassis-mounted channel supports; and detent means in the ends of the chassis supports, normally engaged with the end rollers of a dolly; and means operable to retract the detent means when the trailer body is supported on its subjoined dollies.

10. An improved truck trailer, as and for the purpose described, comprising a wheeled chassis mounting a floor; at least two transverse supports fixedly mounted on the floor adjacent the ends thereof, each said support comprising an open-topped channel member having upstanding sides with continuously shouldered top edges incorporating centrally disposed locating sockets, the ends of the sides being recessed to form latching notches; spring-loaded detents journaled in and adjacent the ends of the bottoms of the channel support members, and normally extending above the said bottoms; detent-retractor mounting means fitted over the sides of the chassis subjacent the ends of the channel members and secured thereto, each said retractor mounting means comprising a U-shaped clamp with a flat top and a fingered bottom having internally grooved sides; spring-loaded detent and detent-retractor means comprising an axially apertured socket in register with the journals in the channel members and mounting a compression spring, each detent incorporating a depending pin reciprocably received in the said axial socket, the compression spring fitted over the pin and having bearing engagement with the detent and the socket, a lazy tongs linkage coupled to the pin and having a pivot reciprocable in the lateral grooves of the bottom of the clamp, the lowermost pivot of the linkage being normally spring-biased to extend below the bottom of the clamp; hinged bearing plates subjoined to the truck and severally apposable to the bottom of each clamp, whereby the linkages are actuated to retract the detents; latch means at each clamp engageable by and adapted to lock each bearing plate when in its clamp-apposed, detent-retracting position; a lifting jack secured to each bearing plate and offset with respect to the hinge; means for retracting the jacks into non-operating position beneath the truck floor; and means for conjointly unlatching all the jacks from their operating positions.

11. A load-carrier for use with truck trailer bodies, freight containers and oversize individual freight items, comprising an elongated flat body vertically offset and extended at both ends to form overhanging raised, load-supporting platforms, the sides of the body having extensions at both ends subjacent the platforms and forming aligned transverse notches therewith; depending wall members subjoined to and integral with the flat body and defining overhangs with the sides thereof and also defining an axial inverted channel with the bottom thereof, the said channel walls being extended at both ends beneath and beyond the said platforms, and forming air lift jack-receiving and supporting sockets with the said platforms and the extended sides of the flat body.

12. A load-carrier according to claim 11, characterized by the fact that the inverted channel section is adapted to receive and overlie the top of an elongated dolly having end sockets at the top thereof, the extended sides of the channel section defining end slot sections in register with the end sockets of the said dolly.

13. A load-carrier according to claim 11, characterized by the fact that the bottom edges of the inverted channel sides are inwardly chamfered and are severally provided with centrally disposed, integral locating pins.

14. An air lift-jack assembly for use with load-carriers of the type described in claim 11, comprising a pill-box type cylinder having a demountable top and an axially apertured bottom; a weighted piston in the cylinder and mounting an integral, depending piston rod, the said piston rod being journaled in the axial aperture, the piston normally being fixed with respect to the cylinder and the latter reciprocable on and over the piston; an air entrant in the top of the cylinder wall, above the uppermost position of the piston; means for securing the cylinder in the socket of a load-carrier comprising a locking pin in the platform and engaging the cylinder, together with a clamping member engaging the outer surface of the cylinder, detachably secured to the platform, the cylinder having a sliding fit in and between the platform and the extended sides of the channel section, and the depending piston rod being received between said extended sides.

15. A fixed base member adapted for use with and engagement by dolly-supported load-carriers and their superposed loads, comprising an elongated channel member having a bilaterally flanged base and defining a dolly-receiving housing; supporting shoulders formed on the top edges of the sides and engageable by and with cooperating bottom edges of dolly-supported load-carriers, the said top edges being socketed to receive locating pins of said carriers; locking means in the bases adapted for locking engagement with end rollers of a dolly when in housed position; and means in the ends of the sides of the base members adapted for locking engagement by load-carrier latching means.

16. A load-supporting and carrier assembly for use with rail-borne freight containers and the like, comprising at least one container fixedly secured to and supported on and by a plurality of spaced, dolly-supported load carriers, severally engageable in and detachably supportable by fixed base members attached to the floor of a vehicle, each said dolly-supported load-carrier and cooperating base member comprising a bottom channel housing an elongated dolly and detachably supporting a mating, superposable load-carrier; air-lift means in the load-carrier locking and engageable on and with a subjacent dolly, said air-lift operable to raise the carrier on the dolly, whereby the load can be rolled to a desired position on and over a fixed base member on a vehicle, with the dolly being housed in said base; and said load-carrier being lowered into mating, seated, load-supported engagement on and with the base, when the air-lift is deactivated, whereby the load is supported directly on the vehicle, and the dolly remains in interlocked, non-load-supporting engagement with the superjacent load-carrier.

17. A track-side car-loading system of the character described, including, in combination, a carrier, a transport vehicle, and railway tracks and juxtaposed roadway for the carrier and transport vehicle; leveling means on the vehicle adapted to bring the floor of the vehicle into register with the plane of the floor of the carrier, said leveling means comprising hinged jacks subjoined to the chassis of the vehicle and adapted to be hingedly dropped from a retracted position under the chassis to a roadway engaging and bearing position, and actuated to lift the vehicle into desired floor-registering position, the said leveling means embodying locking elements engageable with the carrier, whereby to appose the vehicle directly against the carrier, and interlocked therewith.

18. Car-loading system according to claim 17, characterized by the fact that the jacks are mounted in spaced pairs on the sides of the vehicle, and at least the jacks on the carrier-engaging side of the vehicle are provided with carrier-gripping means adapted to be progressively moved toward the carrier as the jacks are swung downwardly into ground-bearing position.

References Cited in the file of this patent

UNITED STATES PATENTS

| | | |
|---|---|---|
| 1,383,462 | Gillette | July 5, 1921 |
| 1,403,568 | Rodowicz | Jan. 17, 1922 |
| 1,615,532 | Baxter | Jan. 25, 1927 |
| 1,799,233 | Holan | Apr. 7, 1931 |
| 1,869,747 | Howard | Aug. 2, 1932 |
| 1,883,538 | Bywater | Oct. 18, 1932 |
| 2,150,371 | Furnish | Mar. 14, 1939 |
| 2,223,275 | Valenzuela | Nov. 26, 1940 |
| 2,304,418 | McMurry | Dec. 8, 1942 |
| 2,623,759 | Forbas | Dec. 30, 1952 |

FOREIGN PATENTS

| | | |
|---|---|---|
| 623,360 | Germany | Dec. 19, 1935 |